United States Patent [19]

Lendaro

[11] Patent Number: 5,034,667
[45] Date of Patent: Jul. 23, 1991

[54] RASTER SIZE REGULATING CIRCUIT

[75] Inventor: Jeffery B. Lendaro, Noblesville, Ind.

[73] Assignee: Thomson Consumer Electronics, Inc., Indianapolis, Ind.

[21] Appl. No.: 508,448

[22] Filed: Apr. 13, 1990

[51] Int. Cl.$^5$ .................. H01S 29/70; G09O 1/04; H04J 5/63

[52] U.S. Cl. .................. 315/411; 315/389; 358/190

[58] Field of Search ............ 315/389, 411; 358/190

[56] References Cited

U.S. PATENT DOCUMENTS

| | | | |
|---|---|---|---|
| 3,721,858 | 3/1973 | Shimizu | 315/29 |
| 3,745,246 | 7/1973 | Kashiwagi | 178/7.5 R |
| 4,104,567 | 8/1978 | Peer et al. | 315/387 |
| 4,298,829 | 11/1981 | Luz | 315/408 |
| 4,559,481 | 12/1985 | Dietz | 315/411 |
| 4,572,993 | 2/1986 | Haferl | 315/408 |
| 4,645,984 | 2/1987 | Sutherland, II et al. | 315/371 |
| 4,801,852 | 1/1989 | Kashiwagi | 315/411 |
| 4,827,194 | 5/1989 | Fernsler | 315/371 |

*Primary Examiner*—Gregory C. Issing
*Attorney, Agent, or Firm*—Joseph S. Tripoli; Joseph J. Laks; Sammy S. Henig

[57] ABSTRACT

An arrangement that compensates for a tendency in a raster width of a display screen of a video display or television to increase when a variation in a beam current occurs, decreases an amplitude of a deflection current to decrease in a nonlinear manner as a function of an increase in the beam current. At a low beam current, a given increase in the beam current produces a decrease in the amplitude of the deflection current that is substantially greater than caused by the same increase at a high beam current.

17 Claims, 1 Drawing Sheet

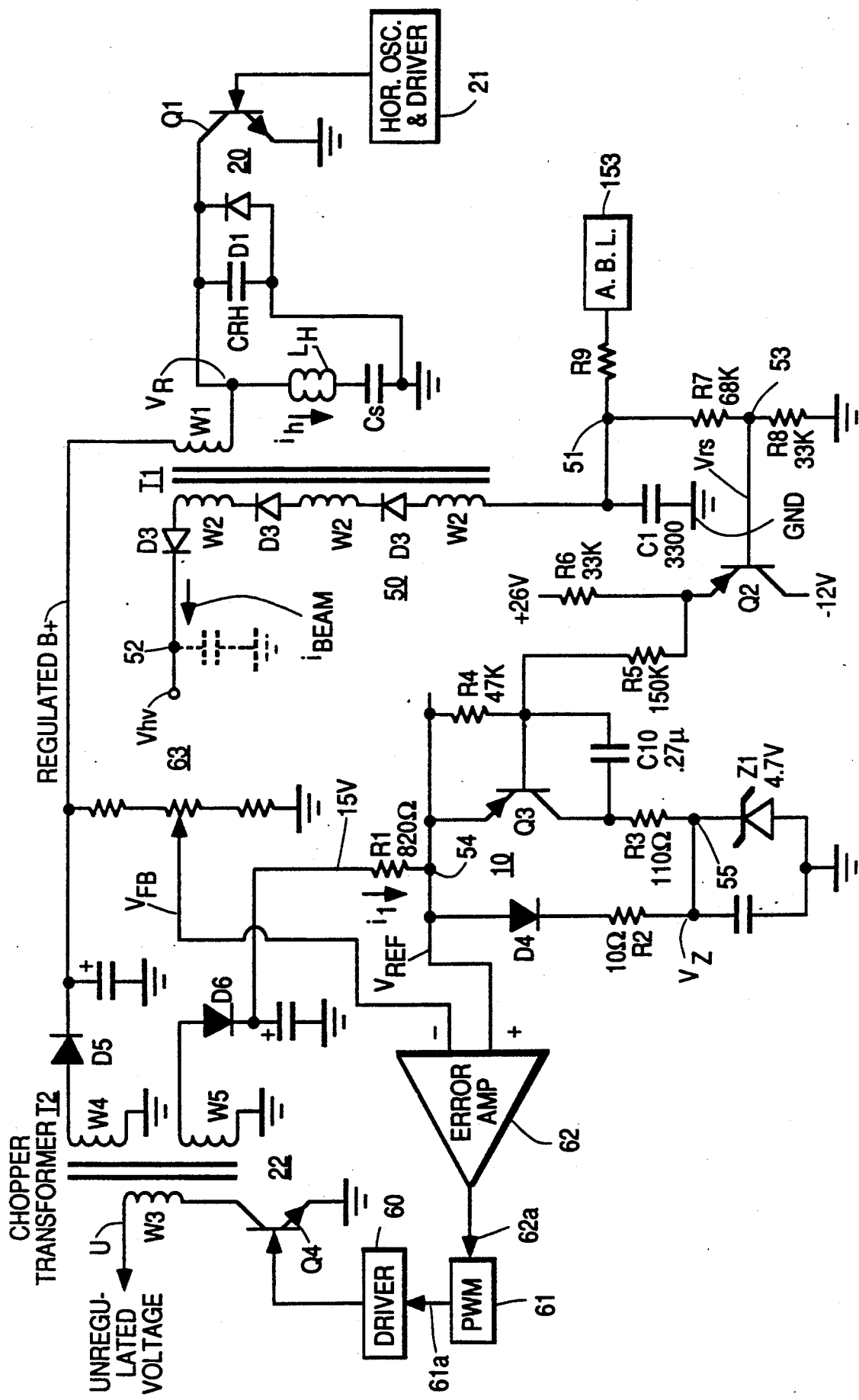

RASTER SIZE REGULATING CIRCUIT

This invention relates to a raster size regulating circuit.

A typical deflection circuit output stage of a television receiver or video display monitor includes a trace switch, a retrace capacitor, an S-shaping capacitor, and a horizontal deflection winding. During the retrace interval the switch is opened, forming a resonant retrace circuit that develops a large amplitude retrace pulse across the deflection winding. The deflection winding generates a sawtooth shaped current which is used to deflect the electron beams horizontally across the screen of a cathode ray tube (CRT). The deflection retrace pulse may be used in conjunction with an integrated high voltage transformer (IHVT) to generate the ultra voltage that accelerates the electron beams to the phosphor screen of the CRT.

The IHVT includes a high voltage winding which may be segmented into several winding sections. A high voltage diode is coupled in series with each winding segment. The large amplitude retrace pulse voltage applied to the primary winding of the IHVT, is stepped up by the high voltage winding, and rectified by the high voltage diodes to develop an ultor voltage of, illustratively, 24 to 29 kilovolt.

Deflection sensitivity and thus raster size vary as a function of the ultor voltage. Variations in the ultor voltage produced by varations in beam current loading may produce undesirable variations in raster size that distort the picture displayed on the picture tube screen. An increase in the level of the beam current, results in a reduction in the ultor voltage that, in turn, increases the width of the raster scan. Conversely, a decrease in the beam current which results in an increase in the ultor voltage may reduce the effect of the deflection field on the beam and cause the raster width to decrease.

The IHVT has a typical source impedance of, illustratively, 1 megaohm and delivers ultor current of 1 to 2 milliampere, average, depending upon the desired picture power of the television receiver. As beam current is drawn by the picture tube anode, the ultor voltage will drop because of the IHVT output impedance and because of the relatively low ultor terminal capacitance formed by the inner and outer conductive coatings of the picture tube. At a low beam current, a given change in the beam current will cause a more significant change in the ultor voltage because the IHVT has a higher output impedance than at a high beam current.

It may be desirable to vary the supply voltage to the deflection circuit output stage that controls the amplitude of the deflection current in a nonlinear manner as a function of a variation of the beam current such that, at the low beam current, a given increase in the beam current produces a larger decrease in the supply voltage and in the deflection current amplitude than at the high beam current.

A raster size regulating apparatus, embodying an aspect of the invention for a video display, includes an arrangement for generating an ultor voltage at an ultor terminal that produces a beam current. An output impedance at the ultor terminal causes the ultor voltage to decrease when the beam current increases that tends to increase a size of a raster on a display screen of the video display. A deflection circuit output stage is responsive to a first control voltage for generating a deflection current in a deflection winding at a controllable amplitude that varies in accordance with the first control voltage. A magnitude of the first control voltage varies in accordance with the beam current to decrease the deflection current amplitude when the beam current increases in a nonlinear manner so as to regulate the size of the raster. An increase in the beam current by a given amount, produces a substantially larger decrease in the deflection current amplitude, when the beam current is smaller than a first value, than when the beam current is larger than the first value.

The sole FIGURE illustrates a deflection apparatus with raster width control, embodying an aspect of the invention.

In the sole FIGURE, a regulated B+ voltage is applied to a primary winding W1 of an IHVT, flyback transformer T1. Primary winding W1 is coupled to a horizontal deflection output stage 20. Output stage 20 includes a horizontal output transistor Q1, a deflection damper diode D1, a deflection retrace capacitor $C_{RH}$ and a horizontal deflection winding $L_H$ coupled in a series relationship with an S-shaping capacitor $C_S$. A horizontal oscillator and driver 21 provides the horizontal rate switching of transistor Q1 to generate a horizontal scanning or deflection current $i_H$ in a deflection winding $L_H$ and a retrace pulse voltage $V_R$ at the collector of transistor Q1.

Flyback transformer T1 functions as a high voltage transformer of a high voltage generator 50. Generator 50 generates an ultor voltage $V_{HV}$ at an ultor terminal 52. To generate ultor voltage $V_{HV}$, retrace pulse voltage $V_R$ is applied to primary winding W1, stepped up by a segmented high voltage winding W2, rectified by corresponding high voltage diodes D3, and filtered by an ultor capacitance C0 to develop DC ultor voltage $V_{HV}$. The ultor capacitance may be provided by the capacitance formed between the inner and outer conductive coatings of the picture tube, not shown.

A DC current path of a beam current $i_{BEAM}$ supplied from ultor terminal 52 begins at a ground conductor GND and goes through resistors R8 and R7 to a resupply terminal 51 of winding W2 that is coupled to the low-AC end of high voltage winding W2. An automatic beam limiter circuit 153 may be coupled to terminal 51 for limiting video drive to the picture tube when beam current loading on ultor terminal 52 reaches a predetermined value, in a well known manner. A filter capacitor C1 is also coupled to terminal 51.

A voltage $V_{rs}$ that is indicative of a magnitude of beam current $i_{BEAM}$ and that is developed between resistors R7 and R8 is coupled at a beam current sense terminal 53 to a supply regulator 22, embodying an aspect of the invention, that controls the B+ voltage. The B+ voltage regulates the raster size by decreasing the amplitude of the deflection current as a function of an increase in the beam current loading, as explained later on.

Supply regulator 22 includes a chopper transistor Q4 that couples an unregulated supply voltage, obtained from, for example, a bridge rectifier, not shown, across a winding W3 of a chopper transformer T2. A diode D5 rectifies a transformer-coupled voltage developed in a secondary winding W4 of transformer T2, as a result of a switching operation of transistor Q4, for producing B+ voltage. A feedback voltage $V_{FB}$ that is representative of the B+ voltage is produced at a terminal of a voltage divider 63 and coupled to an inverting input terminal of an error amplifier 62. A controllable reference voltage $V_{REF}$ that is produced in a nonlinear network 10, embodying an aspect of the invention, is coupled to a noninverting input terminal of amplifier 62. Voltage $V_{REF}$ varies in a nonlinear manner as a function of the beam current that flows through resistor R8, as explained later on.

An output terminal 62a of amplifier 62 is coupled to an input terminal of a pulse-width-modulator 61 that produces a pulse-width modulated signal 61a having a duty cycle that varies in accordance with the B+ voltage and in accordance with voltage $V_{REF}$, controlled by nonlinear network 10. Signal 61a is coupled through a driver stage 60 to a base electrode of chopper transistor Q4 for varying the switching duty cycle of transistor Q4. For a given level of the beam current or of voltage $V_{REF}$, the B+ voltage is maintained constant as a result of the negative feedback loop, in a well known manner.

Nonlinear arrangement 10 includes a transistor Q2 having its base electrode coupled to terminal 53 where beam current representative voltage $V_{rs}$ is developed. Transistor Q2 operates as an emitter follower having its emitter coupled to a base electrode of a transistor Q3 via a resistor R5. The emitter electrode of transistor Q3 is coupled to a terminal 54 for controlling voltage $V_{REF}$. The base of transistor Q3 is also coupled to terminal 53 via a resistor R4. The collector electrode of transistor Q3 is coupled via a resistor R3 to a cathode of a zener diode Z1 that develops a zener voltage $V_Z$ of 4.7 volts at a terminal 55. Transistor Q3 and resistor R3 form a variable impedance or a controllable current source network between terminals 54 and 55 that varies in response to variations in voltage $V_{rs}$. A diode D4 and a resistor R2, coupled in series, form a second network that is coupled between terminals 54 and 55 in parallel with the variable impedance network of transistor Q3 and resistor R3.

The base voltage of transistor Q3 is established in accordance with voltage $V_{rs}$ and the ratio between resistors R4 and R5. When the beam current is zero, transistor Q3 is maintained substantially in cut-off as a result of a predetermined ratio between resistors R4 and R5 forming a voltage divider. A DC current $i_1$ through a resistor R1 that flows to terminal 54 flows substantially through diode D4 and resistor R2 but not through transistor Q3 when transistor Q3 is in cut-off. Therefore, at zero beam current, voltage $V_{REF}$ is equal to the sum of zener voltage $V_Z$, a forward voltage drop in diode D4, $V_D$, and a voltage drop across resistor R2 that is equal to $i_1 \cdot R2$.

As the beam current increases, transistor Q3 conducts a greater portion of current $i_1$ and, hence, reduces the current flow through diode D4 and resistor R2. Therefore, voltage $V_{REF}$ becomes less positive as beam current $i_{BEAM}$ increases. Diode D4 maintains the collector-emitter voltage across transistor Q3 above its saturation value at a low beam current such that the voltage across resistor R2 is maintained in the 100-200 mv range.

The increase in beam current $i_{BEAM}$ causes ultor voltage $V_{HV}$ to decrease as a result of beam current loading of transformer T1. A decrease in voltage $V_{REF}$ occurs as a result of the increase in the beam current, as explained before. The decrease in voltage $V_{REF}$ will cause the B+ voltage to decrease as well, as a result of the negative feedback loop. The decrease in the B+ voltage compensates for the tendency of the raster width to increase as a result of the decrease in ultor voltage $V_{HV}$.

At a predetermined level of the beam current, transistor Q3 becomes fully saturated. Therefore, in accordance with an inventive feature, a given increase in beam current $i_{BEAM}$ will have a substantially smaller effect on voltage $V_{REF}$ than at a lower beam current, when transistor Q3 operates as a controllable current source. For example, when the beam current increases from zero to, for example, 300 μA, the B+ voltage decreases by 1.3%. In comparison, when the beam current increases from 300 to 1525 μA, an increase that is approximately four times than in the range 0-300 μA, the B+ voltage decreases by only 0.4%. This feature is desirable because at a lower beam current, ultor voltage $V_{HV}$ decreases more for a given increase in the beam current than at a higher beam current. Consequently, in accordance with an inventive feature, the decrease in the B+ voltage that is required for maintaining the raster width constant is made larger at a low beam current than at a high beam current.

When the beam current is significantly high, transistor Q2 operates as a clamp to prevent voltage $V_{rs}$ from becoming more negative than −12 volts. Therefore, an undesirable further decrease in voltage $V_{REF}$ at such significantly high beam current that would have occurred due to the current increase in resistor R5 is prevented by the clamping operation.

A capacitor C10 that is coupled between the base and collector of transistor Q3 forms an R-C network with resistors R4 and R5 having a large time constant that is in the milliseconds range. Such large time constant, advantageously, prevents a fast change in the beam current due to, for example, television station channel selection change or a sudden large change in the brightness of the picture scene from producing a fast change in voltage $V_{REF}$. Had such fast change in voltage $V_{REF}$ been allowed to occur, the negative feedback loop that generates voltage B+ might not have been able to respond fast enough. Therefore, a distortion in the picture and an undesirable sound in transformer T2 due to mechanical vibration might have occurred. Thus, the large value of capacitor C1 prevents such undesirable transient condition from occurring.

What is claimed is:

1. A raster size regulating apparatus for a video display, comprising:

means for generating an ultor voltage at an ultor terminal of a cathode ray tube that produces a beam current such that an output impedance at said ultor terminal causes said ultor voltage to change when said beam current changes that tends to affect a size of a raster on a display screen of said video display;

a deflection circuit output stage responsive to an output supply voltage for generating a deflection current in a deflection winding at a controllable amplitude that varies in accordance with said output supply voltage;

means for generating a first control voltage at a magnitude that varies in accordance with said beam current; and a power supply responsive to said first control voltage for generating said output supply voltage that is coupled to said output stage to energize said output stage and that varies in accordance with said first control voltage to decrease said deflection current amplitude in a nonlinear manner when said beam current increases so as to regulate said size of said raster, such that an increase in said beam current by a given amount, produces a substantially larger decrease in said deflection current amplitude when said beam current is smaller than a first value than when said beam current is larger than said first value.

2. An apparatus according to claim 1 wherein said ultor voltage generating means comprises, a high voltage transformer having a first winding for developing in said first winding first voltage pulses and a high voltage winding for transformer-coupling said first voltage pulses to said ultor terminal via a high voltage rectifier.

3. An apparatus according to claim 2 further comprising, a resistor coupled in series with said high voltage winding for generating a beam current indicative voltage in said resistor that is coupled to said first control voltage generating means for generating said first control voltage in accordance therewith.

4. An apparatus according to claim 2 wherein said resistor is coupled between a low voltage end terminal of said high voltage winding and a common conductor.

5. An apparatus according to claim 1 wherein said power supply operates as a switch mode power supply.

6. An apparatus according to claim 5 further comprising, a delay network that is coupled to said first control voltage generating means for preventing a sudden increase in said beam current from producing a distortion in an image on a display screen of said cathode ray tube.

7. A raster size regulating apparatus for a video display, comprising:
a high voltage transformer having a first winding for developing in said first winding first voltage pulses and a high voltage winding for transformer-coupling said first voltage pulses to an ultor terminal of a cathode ray tube via a high voltage rectifier for generating an ultor voltage at said ultor terminal that produces a beam current such that an output impedance at said ultor terminal causes said ultor voltage to decrease when said beam current increases that tends to increase a size of a raster on a display screen of said video display;
a deflection circuit output stage responsive to a first control voltage for generating a deflection current in a deflection winding at a controllable amplitude that varies in accordance with said first control voltage;
a source of a first current;
a first resistor coupled to said source of said first current to conduct a first portion of said first current for generating said first control voltage in accordance with a voltage that is developed in said first resistor; and
a transistor having a first main current conducting terminal that is coupled at a junction between said source of said first current and said first resistor for conducting a second portion of said first current and a control terminal that is responsive to said beam current, said transistor operating as a controllable current source when said beam current is smaller than a predetermined first value for decreasing the voltage in said first resistor when said beam current increases that, in turn, causes said amplitude of said deflection current to decrease, said transistor operating as a conductive switch when said beam current is larger than said first value for preventing an increase in said beam current above said first value from substantially affecting said deflection current.

8. An apparatus according to claim 7 further comprising a diode coupled in series with said first resistor to form a first series network, wherein said first transistor is coupled in parallel with said first series network.

9. An apparatus according to claim 7 further comprising, a beam current sampling resistor coupled to said resistor for generating a beam current representative voltage.

10. An apparatus according to claim 9 further comprising, an emitter follower having a base electrode that is coupled to said beam current indicative voltage and an emitter electrode that is coupled via a second resistor to said control terminal of said transistor such that when said beam current is substantially greater than said first value said emitter follower clamps an emitter voltage to a predetermined level.

11. A raster size regulating apparatus for a video display, comprising:
a high voltage transformer having a first winding for developing in said first winding first voltage pulses and a high voltage winding for transformer-coupling said first voltage pulses to an ultor terminal of a cathode ray tube via a high voltage rectifier for generating an ultor voltage to said ultor terminal that produces a beam current such that an output impedance at said ultor terminal tends to cause said ultor voltage to decrease when said beam current changes, thereby affecting a size of a raster on a display screen of said video display;
a deflection circuit output stage responsive to a first control voltage for generating a deflection current in a deflection winding at a controllable amplitude that varies in accordance with said first control voltage; and
a transistor stage having a control terminal that is responsive to said beam current for generating said first control voltage, said transistor stage operating as a controllable current source when said beam current is within a predetermined range of values for varying said first control voltage when said beam current increases in a manner that causes said amplitude of said deflection current to decrease and as a switch when said beam current is outside said range of values.

12. An apparatus according to claim 11 further comprising, a driver stage for generating a second control voltage at said control terminal of said transistor that varies in accordance with said beam current such that when said beam current is larger than a predetermined value said driver stage operates as a clamp circuit to prevent a further increase in said beam current from substantially affecting said first control voltage.

13. An apparatus according to claim 11 further comprising, an R-C filter network coupled to said first control voltage generating means and having a time constant greater than a millisecond that reduces a rate of change in said first control voltage when a change in said beam current occurs.

14. An apparatus according to claim 13 wherein said R-C filter network comprises a capacitor that forms a Miller feedback in said transistor stage.

15. A raster size regulating apparatus for a video display, comprising:
means for generating an ultor voltage at an ultor terminal of a cathode ray tube that produces a beam current such that an output impedance at said ultor terminal causes said ultor voltage to change when said beam current changes that tends to affect a size of a raster on a display screen of said video display;
a deflection circuit output stage responsive to a first control voltage for generating a deflection current in a deflection winding at a controllable amplitude that varies in accordance with said first control voltage; and means for generating said first control voltage at a magnitude that varies in accordance with said beam current to decrease said deflection current amplitude when said beam current increases so as to regulate said size of said raster, said first control voltage generating means including means for clamping said first control voltage in accordance with a first voltage to reduce the variation in said first control voltage and in said deflection current for a given increase in said beam current when said beam current is within a first range of values such that the clamping operation is disabled when said beam current is within a second ranges of values.

16. An apparatus according to claim 15 wherein the clamping operation causes the amount by which said deflection current decreases to be smaller for a given increase in said beam current when said beam current increases above a first predetermined level.

17. An apparatus according to claim 16 further comprising, second means coupled to said first control voltage generating means for clamping said first control voltage in accordance with a second voltage when said beam current increases above a second predetermined level that is larger than said first predetermined level such that the clamping operation of said second clamping means is disabled when said beam current is smaller than said second predetermined level.

* * * * *